(12) United States Patent
Cho et al.

(10) Patent No.: US 10,946,708 B2
(45) Date of Patent: Mar. 16, 2021

(54) BUSH DEVICE FOR EYE SECTION OF LEAF SPRING

(71) Applicants: Hyundai Motor Company, Seoul (KR); Kia Motors Corporation, Seoul (KR)

(72) Inventors: Sung-Han Cho, Gyeonggi-do (KR); Yong-Soo Lee, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 16/179,922

(22) Filed: Nov. 3, 2018

(65) Prior Publication Data

US 2019/0315177 A1 Oct. 17, 2019

(30) Foreign Application Priority Data

Apr. 17, 2018 (KR) .......................... 10-2018-0044585

(51) Int. Cl.
*B60T 11/12* (2006.01)
*B60G 11/12* (2006.01)
*B60G 11/113* (2006.01)

(52) U.S. Cl.
CPC ............ *B60G 11/12* (2013.01); *B60G 11/113* (2013.01); *B60G 2202/112* (2013.01); *B60G 2204/121* (2013.01); *B60G 2204/41* (2013.01); *B60G 2204/43* (2013.01)

(58) Field of Classification Search
CPC ....... F16F 1/26; F16F 1/28; F16F 1/30; B60G 11/04; B60G 11/12; B60G 2204/121

USPC .......................................................... 267/269
See application file for complete search history.

(56) References Cited

U.S. PATENT DOCUMENTS

| 1,548,049 A | * | 8/1925 | Lord | ...................... | B60G 11/12 |
| | | | | | 267/269 |
| 1,707,213 A | * | 3/1929 | Lord | ...................... | B60G 11/12 |
| | | | | | 267/269 |
| 1,901,026 A | * | 3/1933 | Giordano | ............... | B60G 11/12 |
| | | | | | 267/269 |
| 1,952,115 A | * | 3/1934 | Borst, Jr. | ............... | B60G 11/12 |
| | | | | | 267/269 |

(Continued)

FOREIGN PATENT DOCUMENTS

| EP | 0556764 A2 | * | 8/1993 | ............. B60G 11/12 |
| JP | H 05-027376 U | | 4/1993 | |

(Continued)

OTHER PUBLICATIONS

Machine translation of EP 0 556 764 A2, retrieved Dec. 30, 2019 (Year: 2019).*

*Primary Examiner* — Bradley T King
(74) *Attorney, Agent, or Firm* — Mintz Levin Cohn Ferris Glovsky and Popeo, P.C.; Peter F. Corless

(57) ABSTRACT

A bush device for an eye section of a leaf spring applied to a suspension of a vehicle is disclosed. The bush device includes a first hollow bush that is configured to be inserted into the eye section, and a plurality of second bushes that are disposed adjacent to both side surfaces of the eye section, respectively. Each of the second bushes have an aperture that is formed at a central portion thereof, and a leaf spring fixing bracket into which the second bushes are inserted.

18 Claims, 4 Drawing Sheets

(56) References Cited

U.S. PATENT DOCUMENTS

| | | | | |
|---|---|---|---|---|
| 2,164,840 A | * | 7/1939 | Rock | B60G 11/12 |
| | | | | 267/52 |
| 2,166,822 A | * | 7/1939 | Parker | B60G 11/12 |
| | | | | 267/264 |
| 2,236,686 A | * | 4/1941 | Jackson | B60G 11/12 |
| | | | | 267/264 |
| 3,345,060 A | * | 10/1967 | Boettger | F16F 1/3686 |
| | | | | 267/269 |
| 3,514,089 A | * | 5/1970 | Harbers | B60G 11/12 |
| | | | | 267/269 |
| RE31,298 E | * | 7/1983 | Herbenar | B60G 11/12 |
| | | | | 267/266 |
| 4,768,807 A | * | 9/1988 | McGibbon | B60G 11/08 |
| | | | | 267/269 |
| 2007/0090623 A1 | * | 4/2007 | Preijert | B60G 11/12 |
| | | | | 280/124.175 |
| 2013/0193663 A1 | * | 8/2013 | Brun | B60G 7/02 |
| | | | | 280/124.128 |
| 2014/0027961 A1 | * | 1/2014 | Molnar | B60G 11/02 |
| | | | | 267/47 |

FOREIGN PATENT DOCUMENTS

| | | |
|---|---|---|
| JP | H 07-243462 A | 9/1995 |
| JP | 2000-249180 A | 9/2000 |
| JP | 2006076410 A | 3/2006 |
| KR | 1998-0041484 U | 9/1998 |

\* cited by examiner

BUSH DEVICE FOR EYE SECTION OF LEAF SPRING

CROSS-REFERENCE TO RELATED APPLICATIONS

This application claims priority to Korean Patent Application No. 10-2018-0044585, filed on Apr. 17, 2018, the disclosure of which is incorporated herein by reference in its entirety.

BACKGROUND

Field of the Disclosure

The present disclosure relates to a bush device for an eye section of a leaf spring, and more particularly, to a bush device in which a rubber bush and a brass bush are simultaneously applied to an eye section of a leaf spring connected to a suspension of a vehicle.

Description of Related Art

As illustrated in FIG. 1 of the related art, a leaf spring of a vehicle generally include an eye section formed thereon to connect an axle and a vehicle body to each other and to be rotated. The type of a bush applied to the eye section is mainly classified into a rubber bush and a brass bush. Although the rubber bush has an advantage of effectively absorbing an impact, breakage and detachment occur due to the weak durability thereof. The brass bush has a relatively good durability, but transmits an impact.

SUMMARY

An object of the present disclosure is to provide a bush device that may effectively absorb an impact and have improved durability using a configuration in which a rubber bush and a brass bush are simultaneously applied to an eye section of a leaf spring connected to a suspension of a vehicle.

According to an aspect of the present disclosure, a bush device for an eye section of a leaf spring applied to a suspension of a vehicle may include a first hollow bush configured to be inserted into the eye section; a plurality of second bushes disposed adjacent to both side surfaces of the eye section, respectively, each of the second bushes having an aperture formed at a central portion thereof; and a leaf spring fixing bracket into which the second bushes are inserted.

Further, a hollow pipe pin may be inserted into the first bush. A hollow inner pipe may be inserted into the aperture of each of the second bushes. Head parts may be formed at both ends of the inner pipe in a circumferential direction, respectively, and each head part may extend by a particular length in a radial direction. The eye section and the second bushes may be coupled to each other by a coupling bolt that passes sequentially through the inner pipe coupled to a first of the second bushes, the pipe pin and the inner pipe coupled to a second of the second bushes. Both ends of the pipe pin may abut and be supported by the head parts of the inner pipes by an axial force exerted by a coupling between the connecting bolt and a nut.

The leaf spring fixing bracket may include a first housing and a second housing.

Each of the first housing and the second housing may have a cavity formed therein to receive the eye section. In addition, a bush receiving portion configured to receive the second bush therein may be formed in each of both side walls of each of the first housing and the second housing disposed adjacent to both side surfaces of the eye section. The first bush may have a circular cross section, and the bush receiving portion may include a semicircular groove having a semicircular cross-section and formed thereon.

Further, on a lower surface of each of both side walls of the first housing or the second housing, bolt bores having a predetermined length may be formed at portions spaced apart from the bush receiving portion towards a front end and a rear end, respectively, by a particular distance. In the first housing or the second housing, bolt apertures may be formed at portions spaced apart from the bush receiving portion towards the front end and the rear end, respectively. A bolt may be inserted through the bolt aperture and be bolt-coupled to each of the bolt bores, which has a thread formed on an inner side thereof, of the first housing or the second housing. Moreover, the first bush may be a brass bush, and the second bush may be a rubber bush.

BRIEF DESCRIPTION OF THE DRAWINGS

A brief description of each drawing is provided to more sufficiently understand drawings used in the detailed description of the present invention.

DETAILED DESCRIPTION

Figure 1:
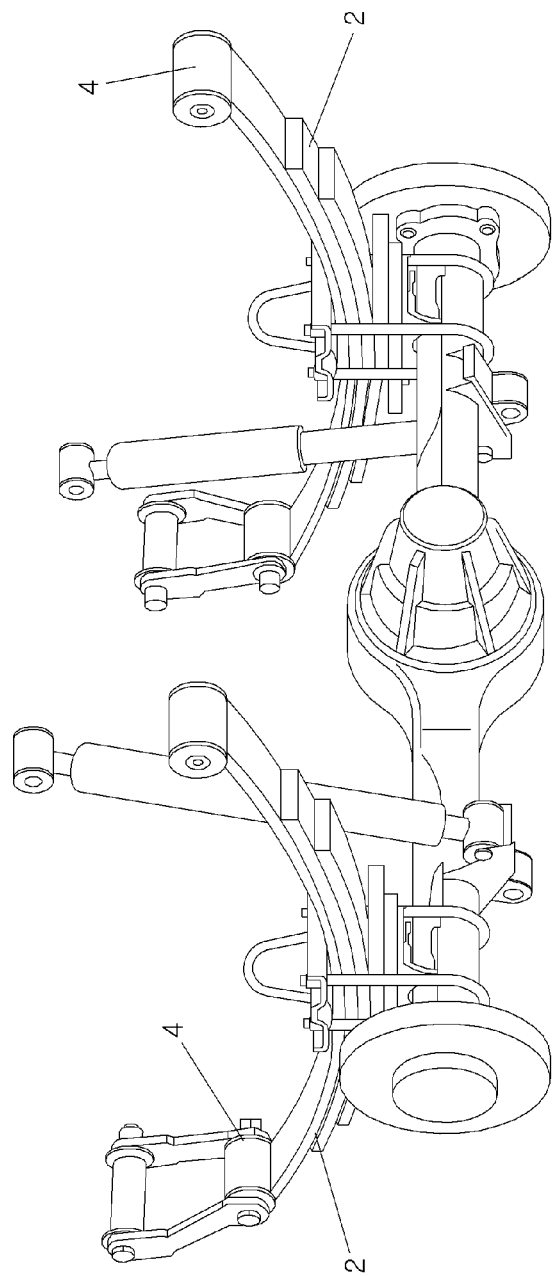
FIG. 1 is a view illustrating a conventional bush device for an eye section of a leaf spring according to the related art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

In order to fully understand the present disclosure, exemplary embodiment will be described with reference to the accompanying drawings. The exemplary embodiments of the present disclosure may be modified in various forms, and the scope of the present disclosure should not be construed as being limited to the exemplary embodiments described in detail below. The present exemplary embodiments are provided to enable those skilled in the art to more fully understand the present disclosure. Therefore, shapes and the like of elements in the drawings may be exaggerated in order to emphasize clearer explanation. It should be noted that the same elements in the drawings are denoted by the same reference numeral. Detailed descriptions of well-known functions and configurations that may unnecessarily obscure the gist of the present disclosure are omitted.

The present disclosure relates to a bush device for an eye section of a leaf spring, and more particularly, to a bush device in which a rubber bush and a brass bush are simultaneously applied to an eye section of a leaf spring connected to a suspension of a vehicle.

Figure 2:
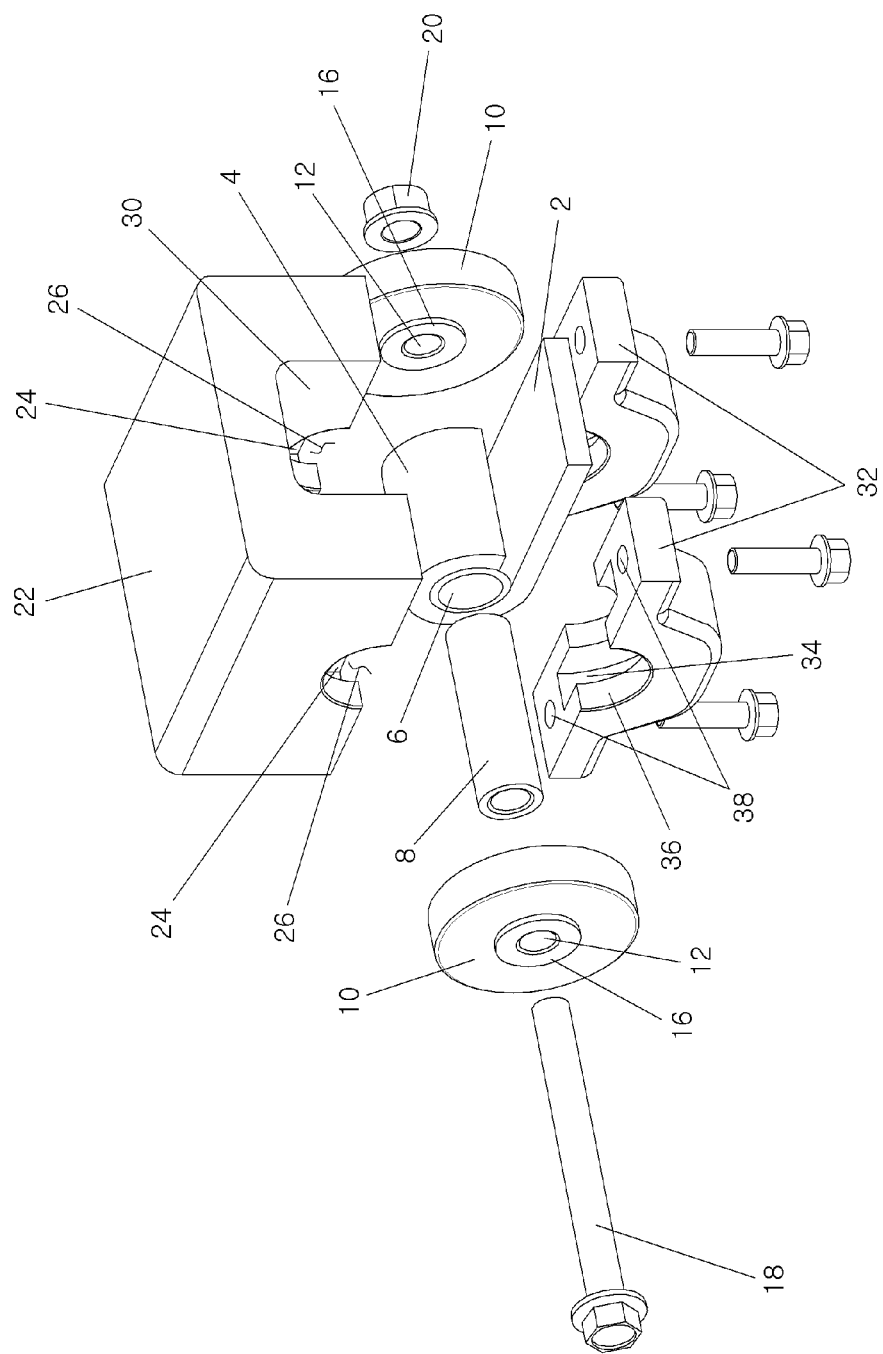
FIG. 2 is a detailed view of a bush device for an eye section of a leaf spring according to an exemplary embodiment of the present disclosure.
Figure 3:
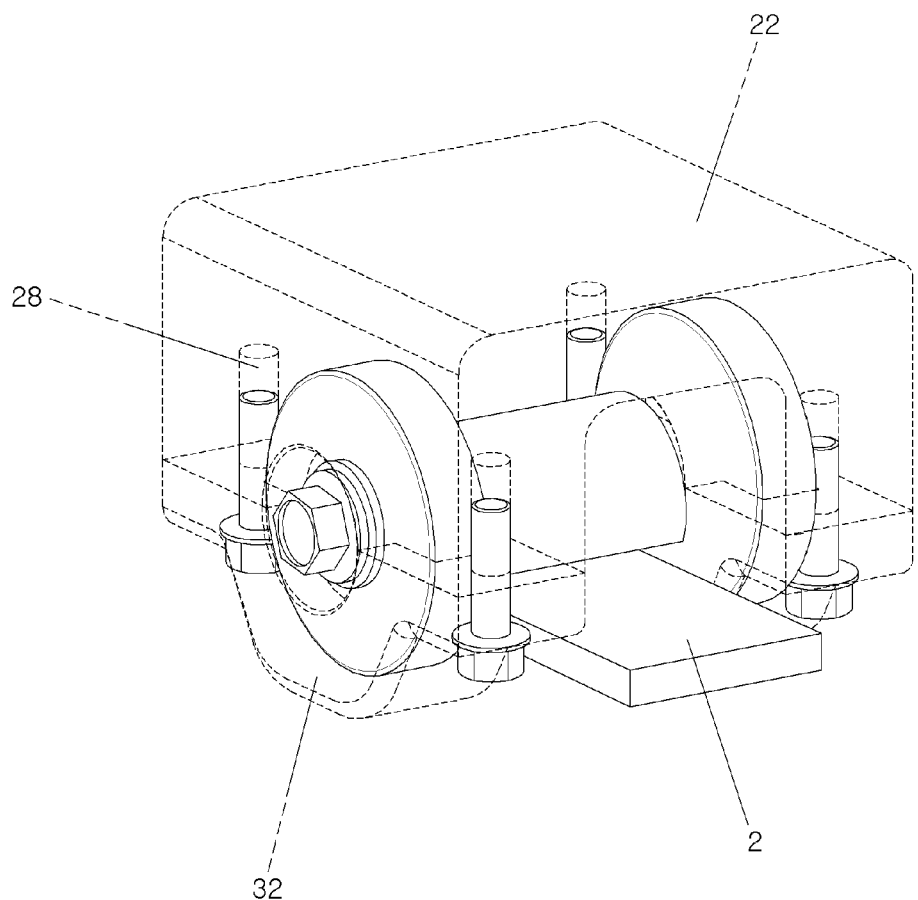
FIG. 3 is a conceptual view of the bush device for the eye section of the leaf spring according to an exemplary embodiment of the present disclosure.

FIG. 2 illustrates a detailed view of a bush device for an eye section of a leaf spring according to the present disclosure, and FIG. 3 illustrates a conceptual view of the bush device for the eye section of the leaf spring according to the present disclosure. Bushes made of different materials and including a first bush 6 made of a brass material and a second bush 10 made of a rubber material may be simultaneously coupled to leaf spring 2 according to the present disclosure.

Figure 4:
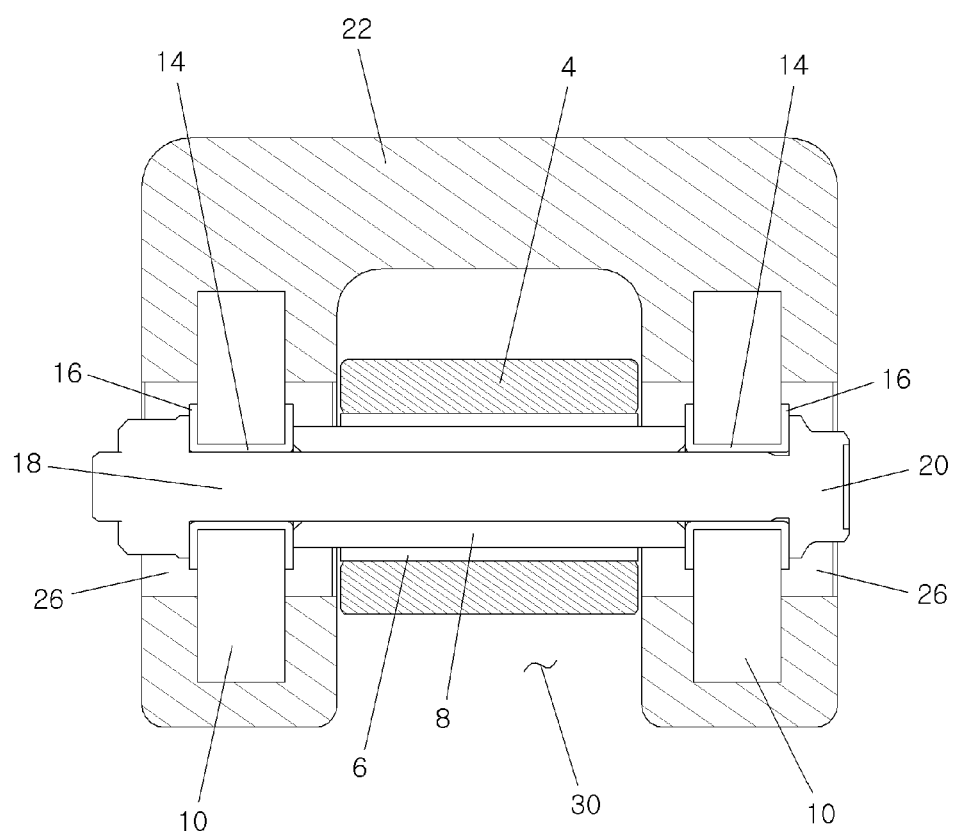
FIG. 4 is a cross-sectional view of the bush device for the eye section of the leaf spring according to an exemplary embodiment of the present disclosure.

FIG. 4 illustrates a cross-sectional view of the bush device for the eye section of the leaf spring according to the present disclosure. The first hollow bush 6 having a central axis which is the same as a central axis of an eye section 4 and having a circular cross section may be inserted inside of and coupled to the eye section 4. The first bush 6 may be formed to have an axial length equal to an axial length of the of eye section 4.

Further, a hollow pipe pin 8 having a central axis which is the same as the central axis of the first bush 6 may be inserted inside of and coupled to the first bush 6. An axial length of the pipe pin 8 may be greater than the axial length of the first bush 6, and thus when the pipe pin 8 is inserted inside the first bush 6, both end portions of the pipe pin 8 may protrude from both ends of the eye section 4 by the same length, respectively. The second bushes 10 may be disposed adjacent to both side surfaces of the eye section 4, respectively, and each second bush may be formed in a shape to have a circular cross section and to extend by a particular length in an axial direction thereof.

An aperture 12 may be formed in a central portion of the second bush 10 to pass through both end surfaces of the second bush 10 in the axial direction of the second bush 10. A hollow inner pipe 14 having a central axis which is the same as a central axis of the second bush 10 may be inserted into the aperture 12 of the second bush 10. Head parts 16 may be formed at both ends of the inner pipe 14 on a circumferential surface, respectively, and each head part may extend in a radial direction by a certain length to have a circular shape. The head part 16 may have an outer diameter greater than an inner diameter of the eye section 4 of the leaf spring 2.

Additionally, a coupling of the eye section 4 and the second bush 10 may be accomplished by a connecting bolt 18 that passes through the inner pipe 14 and the pipe pin 8. In other words, the connecting bolt 18 may pass sequentially through the inner pipe 14 coupled to a first of the second bushes 10, the pipe pin 8, and the inner pipe 14 coupled to a second of the second bushes 10, a nut 20 may be then coupled to an end portion of the connecting bolt to couple the eye section 4 and the second bushes 10 disposed at both end portions of the eye section 4 to each other. The central axis of the inner pipe 14 may be disposed coaxially with the central axis of the first bush 6 by the above coupling, and both ends of the pipe pin 8 may abut and secured to the head parts 16 of the inner pipes 14 by an axial force exerted by a coupling of the connecting bolt 18 and the nut 20.

The first bush 6 may not apply a torsional force to the second bush 10, and may be fixed to prevent rotation thereof with respect to the eye section 4, and thus the first bush may be slip-rotated about the pipe pin 8 as a rotational axis. A leaf spring fixing bracket into which the second bush 10 is inserted may be formed outside the eye section 4 to which the first bush 6 and the second bushes 10 may be coupled. The leaf spring fixing bracket may be divided into a first housing 22 and second housings 32, and each of the first housing 22 and the second housings 32 may include a cavity formed therein to receive the eye section 4. The first housing 22 may be coupled to an upper side of the eye section 4 to which the first bush 6 and the second bush 10 are simultaneously coupled, and the second housing 32 which is coupled to a lower portion of the first housing 22 at an upper end may be coupled to a lower side of the eye section.

Although the drawings that illustrate one exemplary embodiment of the present disclosure show the configuration in which the first housing 22 is disposed on an upper portion of the leaf spring and the second housing 32 is disposed on a lower portion of the leaf spring, this configuration is merely one exemplary embodiment, and the positions of the first housing 22 and the second housing 32 may be interchanged.

Furthermore, the first housing 22 may be formed in a shape in which the lower portion is open and the cavity is formed therein, and thus the eye section 4 and the upper end of the second bush 10 may be disposed in the first housing. Bush receiving portions 24 may be formed in both side walls of the first housing 22 disposed adjacent to both side surfaces of the eye section 4, respectively, and upper semi-circular portions of the second bushes 10 may be received in the bush receiving portions, respectively. Each of the bush receiving portions 24 may be formed in a shape in which a side wall of the first housing 22 is removed upward from a lower surface thereof, a peripheral portion of the second bush 10 may be received in the bush receiving portion in a front-rear direction, and the bush receiving portion may be formed to have a shape and size to receive the upper semi-circular portion of the second bush 10 therein without a gap.

A semicircular shaped groove 26 having a semicircular cross section and having a central axis which is disposed coaxially with the central axis of the inner pipe 14 may be formed at a portion of each of the side walls of the first housing 22 where the bush receiving portion 24 is formed. The semicircular groove 26 formed in the first housing 22 may be formed in a through-groove shape that passes through the side wall of the first housing 22 in an axial direction of the eye section.

Openings 30 may be formed in a front wall and a rear wall of the first housing 22, respectively, and each of openings may be formed in a shape in which each of the front and rear walls is removed upward from a lower end. The openings 30 may be configured to allow a portion of the leaf spring 2 that extends from the eye section 4 to be inserted thereinto. When the eye section 4 is rotated, a position of the portion of the leaf spring 2 that extends from the eye section 4 may be displaced in a vertical direction. Therefore, the openings 30 may prevent the first housing 22 from interfering with the displacement of the leaf spring 2.

The first housing 22 may be formed to have an inverted U-shaped cross section that is open toward the eye section 4 as shown in FIG. 4, and when the first housing 22 is formed to have an inverted U-shape, the bush receiving portions 24 may be formed in both side walls that define the opening.

On a lower surface of each of both side walls of the first housing 22, bolt bores 28 having a predetermined length that extend toward an upper portion of the first housing 22 may be formed at portions spaced apart from the bush receiving portion 24 towards a front end and a rear end, respectively, by a particular distance. A thread may be formed on an inner circumferential surface of each of the bolt bores 28. The second housings 32 may be coupled to the second bushes 10, respectively. The second housing 32 may be open upward, and a bush receiving portion 34 may be formed in the second housing to receive a lower semicircular portion of the second bush 10 therein.

A peripheral portion of the second bush 10 may be received in the bush receiving portion 34 in a front-rear direction thereof, and the bush receiving portion 34 may be formed to have a shape and size to receive the lower semicircular portion of the second bush 10 therein without a gap. In each of the second housings 32, a semicircular shaped groove 36 having a semicircular cross-section and having a central axis which is disposed coaxially with the central axis of the inner pipe 14 may be formed in each of both side walls that define the bush receiving portion 34.

The semicircular groove 36 formed in each of the second housings 32 may be formed in a through-groove shape that passes through both side walls of the second housing 32 in the axial direction of the eye section. In each of the second housings 32, bolt apertures 38 that pass through the second housing 32 may be formed at portions spaced apart from the bush receiving portion 34 towards a front end and a rear end by a certain distance, respectively. The second housings 32 may be coupled to both side walls of the first housing 22, respectively, and the first housing 22 and the second housing 32 may be coupled to each other by a bolt that passes through the bolt aperture 38 of the second housing 32 to the bolt bore 28, which has a thread formed on an inner side thereof, of the first housing 22.

When the first housing 22 and the second housing 32 are coupled to each other, the semicircular groove 26 of the first housing and the semicircular groove 36 of the second housing may form a circular shaped space having a diameter greater than that of the head part 16 and less than that of the second bush 10, and thus a head portion of the connecting bolt 18 and the nut 20 may be disposed inside a circular space formed by the semicircular grooves 26 and 36. The connecting bolt 18 and the pipe pin 8 may be mounted on the first housing 22 and the second housing 32 by the second bush 10 to absorb an impact to the eye section 4 of the leaf spring 2.

In addition, the second bush 10 mounted on the first housing 22 and the second housing 32 may absorb an impact transmitted from, e.g., a road surface, and may be secured to the first housing 22 and the second housing 32 without a gap. As a result, an elastic deformation in a rotational direction may be prevented, and thus service life may be increased.

According to the present disclosure, there is an advantage in that by applying the rubber bush to the eye section of the leaf spring connected to the suspension of the vehicle, an impact of a road surface may be prevented from being transmitted to a vehicle body, and by simultaneously applying the brass bush to the eye section, the stress by rotational elastic deformation of the rubber bush may be reduced, thereby increasing the lifetime of the brass bush and the rubber bush.

As the lifetime of the brass bush and the rubber bush is increased, a quality assurance costs and a maintenance cost may be reduced.

The above-described exemplary embodiment of the bush device for the eye section of the leaf spring of the present disclosure is merely illustrative and those skilled in the art to which the present disclosure pertains will appreciate that various modifications and other embodiments may be made from the above-described exemplary embodiment of the present disclosure. It is therefore to be easily understood that the present disclosure is not limited to only the form set forth in the foregoing description. Accordingly, the true technical protection scope of the present disclosure should be determined by the technical idea of the appended claims. It is also to be understood that the present disclosure includes all modifications, equivalents, and substitutes falling within the spirit and scope of the present disclosure defined by the appended claims.

What is claimed is:

1. A bush device for an eye section of a leaf spring applied to a suspension of a vehicle, comprising:
    a first hollow bush configured to be inserted into the eye section;
    a plurality of second bushes disposed adjacent to both side surfaces of the eye section, respectively, each of the second bushes having an aperture formed at a central portion thereof; and
    a leaf spring fixing bracket into which the second bushes are inserted,
    wherein the leaf spring fixing bracket includes a first housing and a second housing detachably coupled to the first housing,
    wherein the first housing includes a cavity formed therein to receive the eye section, and each of the first housing and the second housing includes a bush receiving portion configured to receive a corresponding one of the second bushes therein,
    wherein a hollow inner pipe is inserted into the aperture of each of the second bushes, and
    wherein head parts are formed at both ends of the inner pipe in a circumferential direction, respectively, and each head part extends by a particular distance in a radial direction of the inner pipe.

2. The bush device for the eye section of the leaf spring of claim 1, wherein a hollow pipe pin is inserted into the first bush.

3. The bush device for the eye section of the leaf spring of claim 1, wherein the eye section and the second bushes are coupled to each other by a coupling bolt that passes through the inner pipe coupled to a first of the second bushes, the pipe pin and the inner pipe coupled to a second of the second bushes.

4. The bush device for the eye section of the leaf spring of claim 3, wherein both ends of the pipe pin abut and be secured to the head parts of the inner pipes by an axial force exerted by a coupling between the connecting bolt and a nut.

5. The bush device for the eye section of the leaf spring of claim 1, wherein the first housing is coupled to an upper side of the eye section to which the first bush and the corresponding one of the second bushes are simultaneously coupled, and the second housing is coupled to a lower side of the eye section.

6. The bush device for the eye section of the leaf spring of claim 1, wherein the second housing is coupled to a lower portion of the first housing.

7. The bush device for the eye section of the leaf spring of claim 1, wherein the bush receiving portion includes a first bush receiving portion formed at both side walls of the first housing and a second bush receiving portion formed at both side walls of the second housing adjacent to both side surfaces of the eye section.

8. The eye section bush device of the leaf spring of claim 7, wherein the first bush has a circular cross section, and each of the first and second bush receiving portions includes a semicircular groove having a semicircular cross-section and formed thereon.

9. The bush device for the eye section of the leaf spring of claim 8, wherein, on a lower surface of each of both side walls of the first housing or the second housing, bolt bores having a predetermined length are formed at portions spaced apart from each of the first and second bush receiving portions towards a front end and a rear end, respectively.

10. The bush device for the eye section of the leaf spring of claim 9, wherein, in the first housing or the second housing, bolt apertures are formed at portions spaced apart from the first or second bush receiving portion towards the front end and the rear end, respectively.

11. The bush device for the eye section of the leaf spring of claim 10, wherein a bolt is inserted through the bolt aperture and bolt-coupled to each of the bolt bores, which includes a thread formed on an inner side thereof, of the first housing or the second housing.

12. The bush device for the eye section of the leaf spring of claim 1, wherein the first bush is a brass bush and each of the second bushes is a rubber bush.

13. A bush device for an eye section of a leaf spring applied to a suspension of a vehicle, comprising:
 a first hollow bush configured to be inserted into the eye section;
 a plurality of second bushes disposed adjacent to both side surfaces of the eye section, respectively, each of the second bushes having an aperture formed at a central portion thereof;
 a hollow pipe pin inserted into the first bush;
 a hollow inner pipe inserted into the aperture of each of the second bushes, wherein head parts are formed at both ends of the inner pipe in a circumferential direction, respectively, and each head part extends by a particular distance in a radial direction of the inner pipe; and
 a leaf spring fixing bracket into which the second bushes are inserted,
 wherein the leaf spring fixing bracket includes a first housing and a pair of second housings detachably coupled with the first housing,
 wherein the first housing includes a cavity formed therein to receive the eye section, and
 wherein each of the first housing and the second housing includes a bush receiving portion configured to receive a corresponding one of the second bushes therein.

14. The bush device for the eye section of the leaf spring of claim 13, wherein the first housing is disposed on an upper portion of the leaf spring, and each of the second housings is disposed on a lower portion of the leaf spring.

15. The bush device for the eye section of the leaf spring of claim 14, wherein the lower portion of the first housing is open and formed with the cavity to allow the eye section and an upper end of the corresponding one of the second bushes to be disposed in the first housing.

16. The bush device for the eye section of the leaf spring of claim 13, wherein the first housing is disposed on a lower upper portion of the leaf spring, and each of the second housings is disposed on an upper portion of the leaf spring.

17. The bush device for the eye section of the leaf spring of claim 13, wherein the bush receiving portion has a first bush receiving portion formed at the first housing and a second bush receiving portion formed at each of the second housings to allow the second bushes to be disposed therein, respectively.

18. The bush device for the eye section of the leaf spring of claim 17, wherein each of the second bush receiving portions is formed to have a shape and size to receive a lower semicircular portion of a corresponding one of the second bushes therein without a gap.

* * * * *